US007917485B1

(12) United States Patent
Gibson et al.

(10) Patent No.: US 7,917,485 B1
(45) Date of Patent: Mar. 29, 2011

(54) RAPID SPECIFICATION AND ELECTRONIC DELIVERY OF CUSTOMIZED PRODUCT INFORMATION

(75) Inventors: Phil Gibson, Sunnyvale, CA (US); Robert Reneau, Brisbane, CA (US); William Citajaya, Cupertino, CA (US); Balraj Gill, Milpitas, CA (US); Jeffrey R. Perry, Cupertino, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 38 days.

(21) Appl. No.: 11/239,833

(22) Filed: Sep. 30, 2005

(51) Int. Cl.
*G06F 7/00* (2006.01)
*G06F 17/30* (2006.01)

(52) U.S. Cl. ........................................ 707/705; 707/781
(58) Field of Classification Search .................. None
See application file for complete search history.

(56) References Cited

U.S. PATENT DOCUMENTS

| | | | | |
|---|---|---|---|---|
| 6,598,026 B1 * | 7/2003 | Ojha et al. | | 705/26 |
| 6,845,316 B2 * | 1/2005 | Yates | | 701/117 |
| 7,032,030 B1 * | 4/2006 | Codignotto | | 709/246 |
| 7,359,496 B2 * | 4/2008 | Qian et al. | | 379/201.07 |
| 7,444,374 B1 * | 10/2008 | Baker | | 709/206 |
| 2002/0052778 A1 * | 5/2002 | Murphy et al. | | 705/14 |
| 2002/0082919 A1 * | 6/2002 | Landau et al. | | 705/14 |
| 2002/0104026 A1 * | 8/2002 | Barra et al. | | 713/202 |
| 2003/0126146 A1 * | 7/2003 | Van Der Riet | | 707/100 |
| 2004/0215793 A1 * | 10/2004 | Ryan et al. | | 709/229 |
| 2005/0004837 A1 * | 1/2005 | Sweeney et al. | | 705/14 |
| 2005/0038735 A1 * | 2/2005 | Goldman et al. | | 705/38 |
| 2005/0080854 A1 * | 4/2005 | Tervo | | 709/206 |
| 2005/0102202 A1 * | 5/2005 | Linden et al. | | 705/27 |
| 2006/0074775 A1 * | 4/2006 | Roman et al. | | 705/27 |
| 2006/0253365 A1 * | 11/2006 | Langshur et al. | | 705/37 |
| 2006/0274086 A1 * | 12/2006 | Forstall et al. | | 345/629 |

OTHER PUBLICATIONS

Ansari, Asim and Carl F. Mela (2003), "E-Customization", Journal of Marketing Research, 40 (2), 131-145.*

* cited by examiner

*Primary Examiner* — Jay A Morrison (57) ABSTRACT

A sender, such as a sales representative, may create a customized product notice message directly from a web site that is then sent to one or more customers. The customized product notice message may contain information, such as URL links, that relate to the product. The product notice message may also be customized to include items such as the sender's company logo and the like. When the user opens the product notice message a tracking message is automatically sent to the user who created the message. The user's activity relating to the content of the message that may be tracked is stored within a data store. This activity data may then be delivered to the sender at predetermined times.

20 Claims, 12 Drawing Sheets

```
--------- Original Message ---------
Subject:        Product Notice Message Opened
                bonnie@abc.com
Date:           Sat, 27 Aug 2005 01:33:11 -0700 (PDT)
From:           new.feedback@xxx.com
To:             bonnie@abc.com Hi BONNIE, We are pleased to inform you that these customers have opened the product notice messages.

Part Number   Customer                                Offer Sent (GMT-08)   Email Opened (GMT-08)
===========   ========                                ===================   =====================
DS90LV004     Ron Jonas <rjonas@xyz.com>              Aug 26 2005  1:08PM   Aug 26 2005  1:17PM
DS90LV004     Ken Ryder <kryder@xyz.com>              Aug 26 2005  1:10PM   Aug 26 2005  2:23PM
DAC121S101    Eric Snavely <snavye@xyz.com>           Aug 26 2005  1:21PM   Aug 26 2005  1:22PM
DAC121S101    Mark Grabowsky <grab@xyz.com>           Aug 26 2005  1:22PM   Aug 26 2005  1:41PM

You will receive additional notification and instructions when they follow links in the offer.

Thank you very much for promoting companyX.  We hope you are successful with this opportunity.

Sincerely,

Web Team
```

*FIG. 11*

RAPID SPECIFICATION AND ELECTRONIC DELIVERY OF CUSTOMIZED PRODUCT INFORMATION

BACKGROUND OF THE INVENTION

With the increasing availability of online product catalogs, many users are accessing the web sites of product manufacturers to become familiar with the products they offer. Not only can the user read about the product specifications in the online catalog, they may also be able to find out other information about the product while they are at the manufacturer's web site. For example, they may be able to access papers, data sheets or other documents that relate to the product. They may even be able to perform a simulation using the product. It is difficult, however, for users to remain knowledgeable about all of the products that are constantly being released from the different manufacturers. For example, many companies change their product lines on a frequent basis and update their web sites frequently. The inconvenience of having to constantly check for new updates may cause many users to not know of these new product offerings.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Generally described, the present invention relates to providing customized product notice messages. A sender, such as a sales representative, may create a customized product notice message directly from a web site that is then sent to one or more customers. The customized product notice message may contain information, such as URL links, that relate to the product. The product notice message may also be customized to include items such as the sender's company logo and the like. When the user opens the product notice message a tracking message is automatically sent to the user who created the message. The user's activity relating to the content of the message that may be tracked is stored within a data store. This activity data may then be delivered to the sender at predetermined times. According to one embodiment, this activity message includes the time and date the links included within the product notice message were accessed along with a list of the products that were accessed by the user. This activity tracking message enables the sender to have appropriate sales/support information when contacting the user at a later time.

Figure 1:
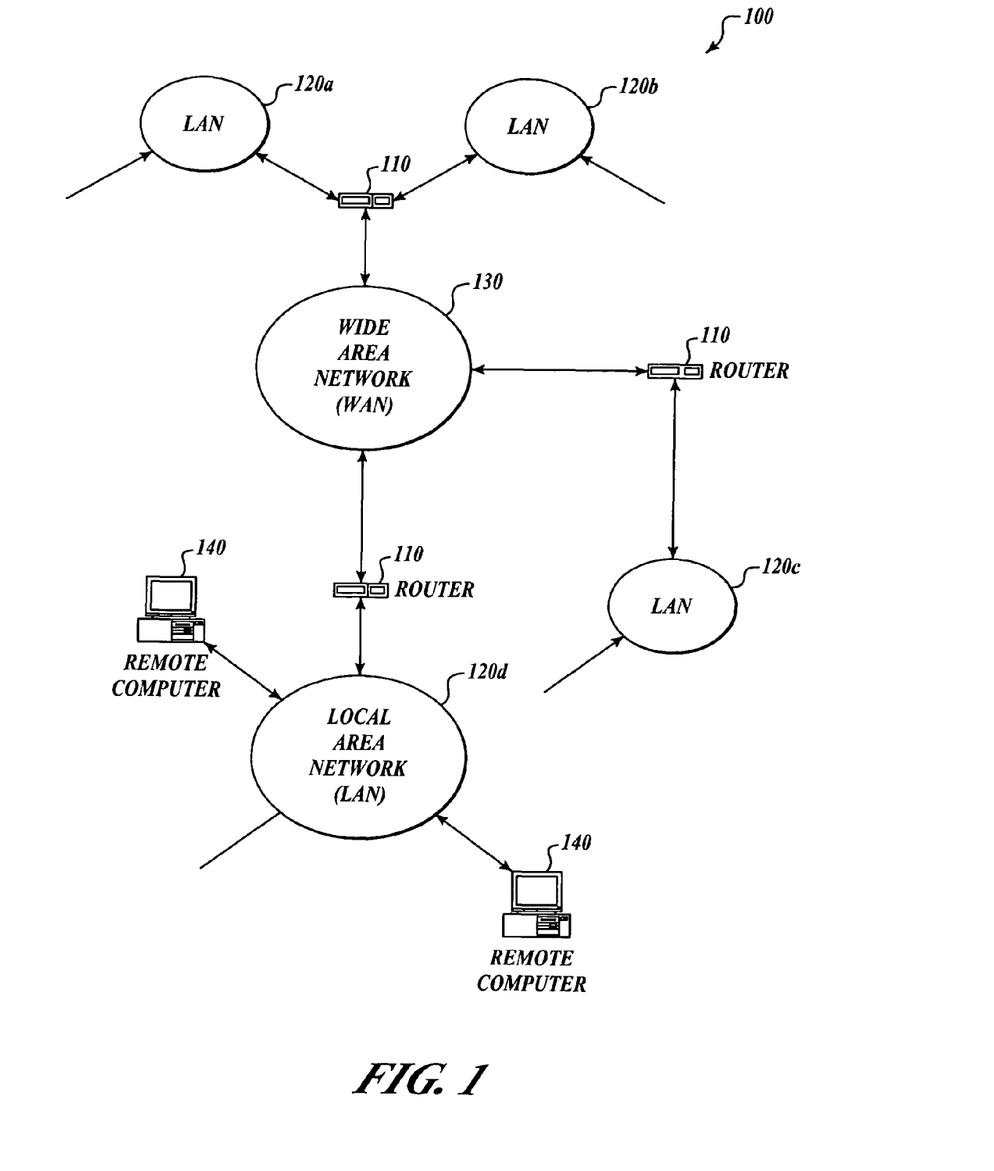
FIGS. 1-3 illustrate an exemplary environment for practicing the invention.
Figure 2:
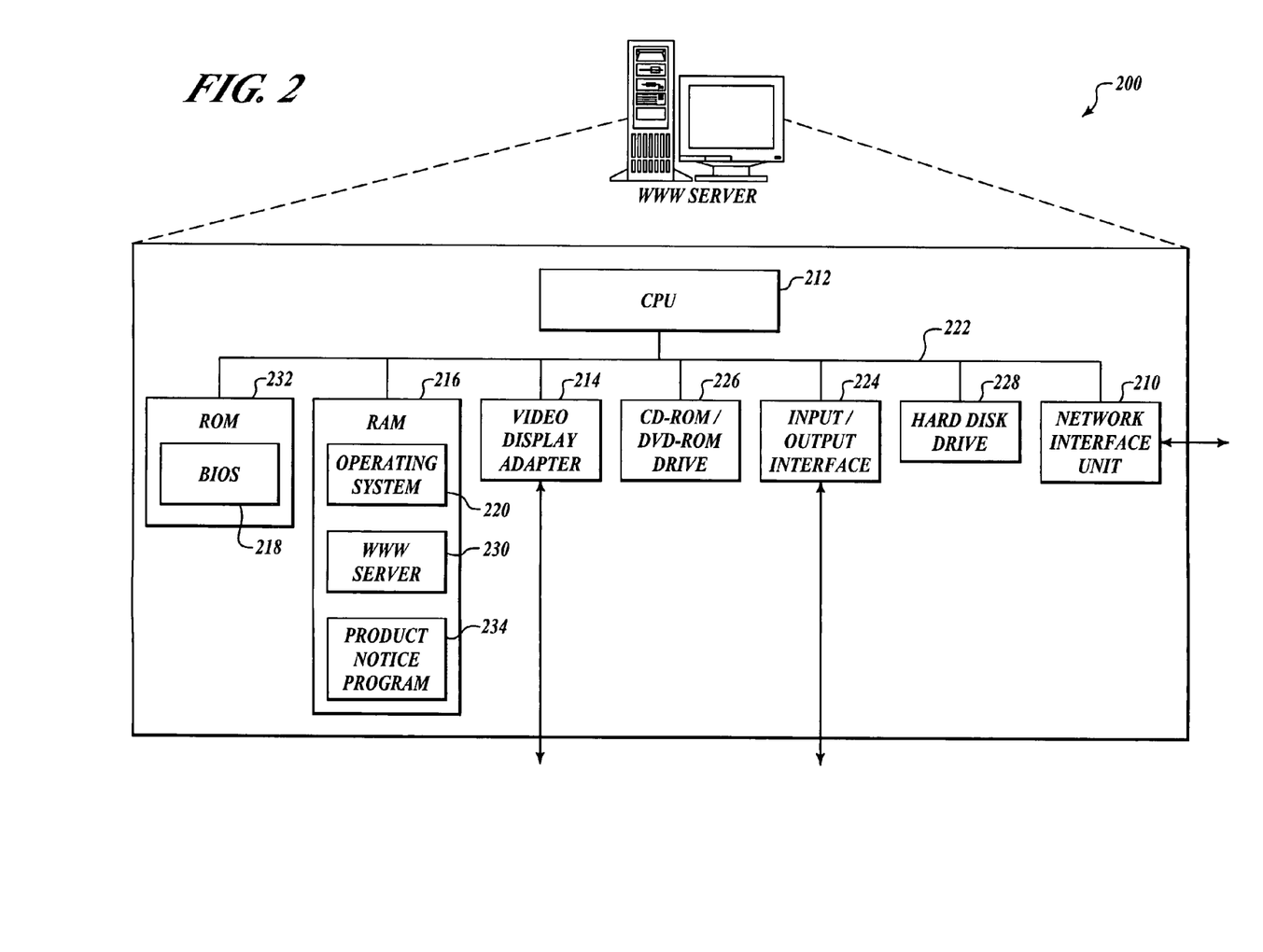
Figure 3:
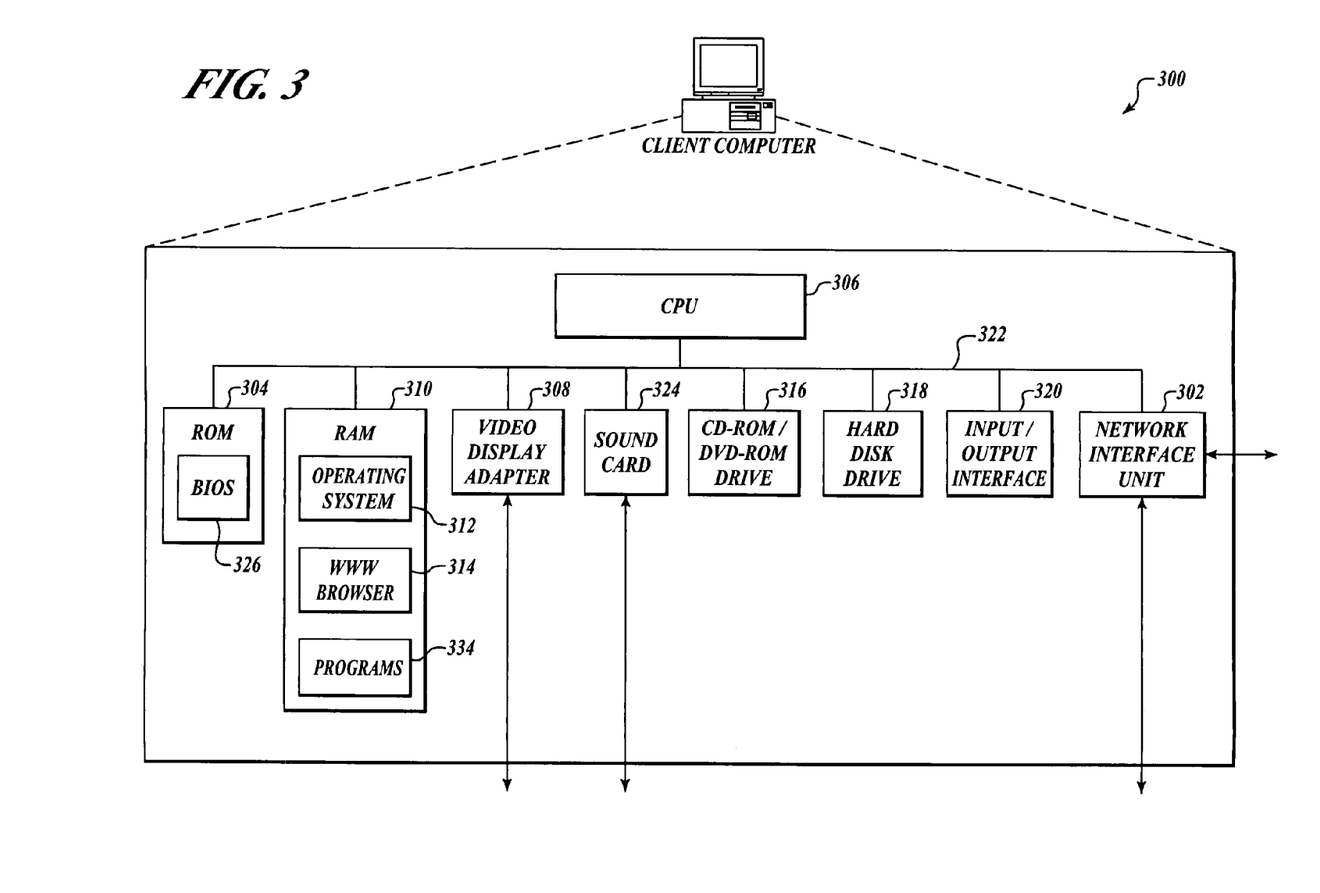

FIGS. 1-3 illustrate an exemplary operating environment and will be described after the description of FIGS. 4-12.

Figure 4:
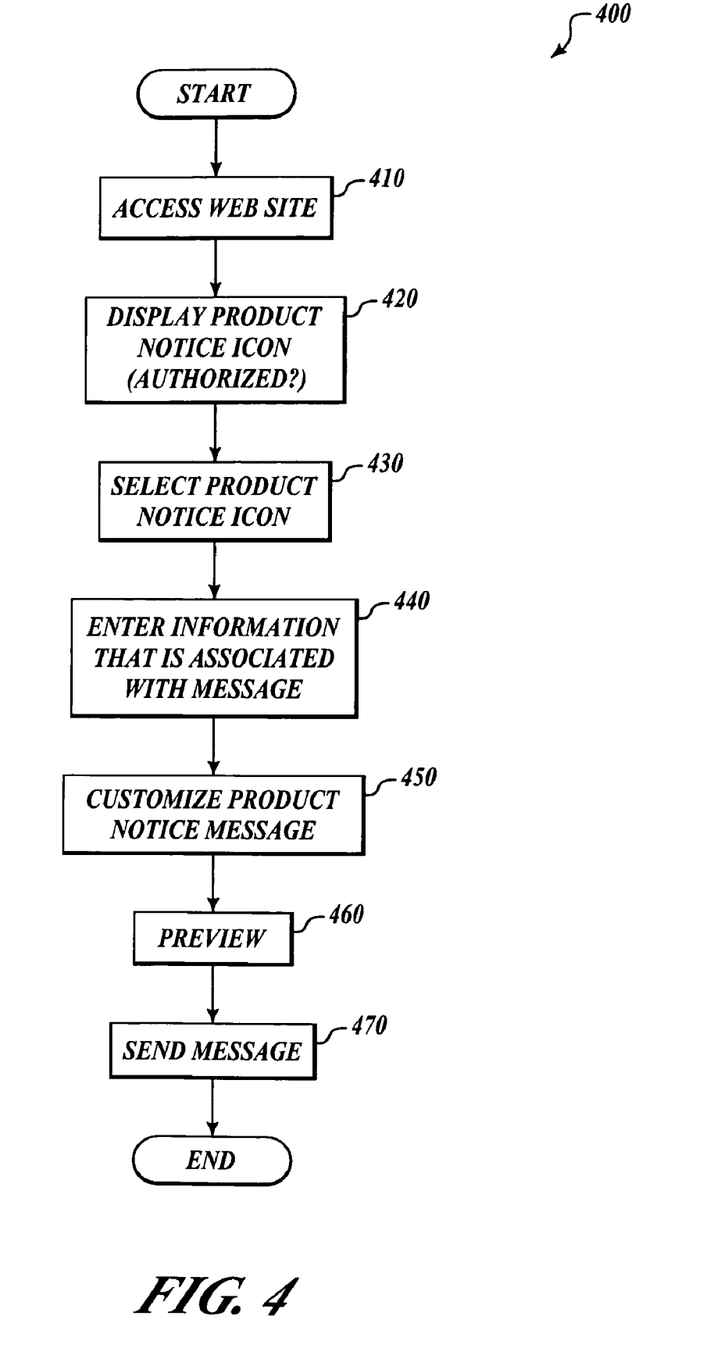
FIG. 4 illustrates a process for creating a product notice message.

FIG. 4 illustrates a process for creating a product notice message, in accordance with aspects of the invention. Generally, a product notice message is a customized message that is sent to one or more users that includes information relating to products that are described and/or available on a website and may be customized with the sender's company information.

After a start operation, the process flows to operation 410, where a user accesses a website. According to one embodiment, the website includes product information for products from one or more companies. For example, the product information may relate to electronics, household goods, business goods, and the like.

Moving to block 420, a product notice icon is displayed on a product web page. According to one embodiment, the product notice icon is only displayed on the web page when the user is an authorized user. The user may be authorized when they meet certain criteria, such as when the user is associated with an approved company. These criteria may change for each company. For example, the user may be considered to be an authorized user when they are an employee of the company selling the products illustrated on the web page, as well as distributors and other sales oriented companies that sell and distribute the products for the company. Determining an authorized user may be performed many different ways. For example, an internet browser cookie may be used to identify an authorized user. When the user accesses the website, a check may be made to determine the presence of the cookie as well as whether the information contained within the cookie identifies the user as an authorized user.

Transitioning to block 430, the user may select the product notice icon. Selecting the product notice icon allows the user to customize a product notice message that may then be sent to one or more users. When the user clicks on the product notice icon they are directed to a specification web page.

Flowing to operation 440, the user enters information on the specification page to create the product notice message. The user may enter a variety of information to customize the product notice, including but not limited to, product information, datasheets, samples, application notes, reference designs, tutorials, online seminar information, packages and models, evaluation boards and other pertinent sales and technical information. The specification page also allows the user to address the product notice message. The user may address the message to a single customer or to more than one customer. According to one embodiment, URL links are included within the message that reference information relating to products. The user may also enter a subject, a personalized message, as well as select the language of the message. For instance, if the user is creating a product notice for one or more Japanese customers, the user may select to create the message in Japanese.

Moving to operation 450, the product notice message may be customized. For example, the user may customize the message to include information about the user's company. This could include information such as displaying a logo of the user's company. The customization of the message may be manual or automatic. For example, the logo could automatically be included in the message based on the identity of the user creating the message. Alternatively, the user could select from a variety of customization options. When the user has finished entering the customizations, they may select to preview the message.

Flowing to operation 460, the user may preview the product notice message before it is delivered to the determined user(s). While the user is previewing the product notice message, they may also edit information within the message in case they want to make some changes to its content.

Transitioning to operation 470, the user may select to send the product notice message. When selected, the message is sent to the user(s) identified in step 440. The process then moves to an end operation where it returns to processing other actions.

Figure 5:
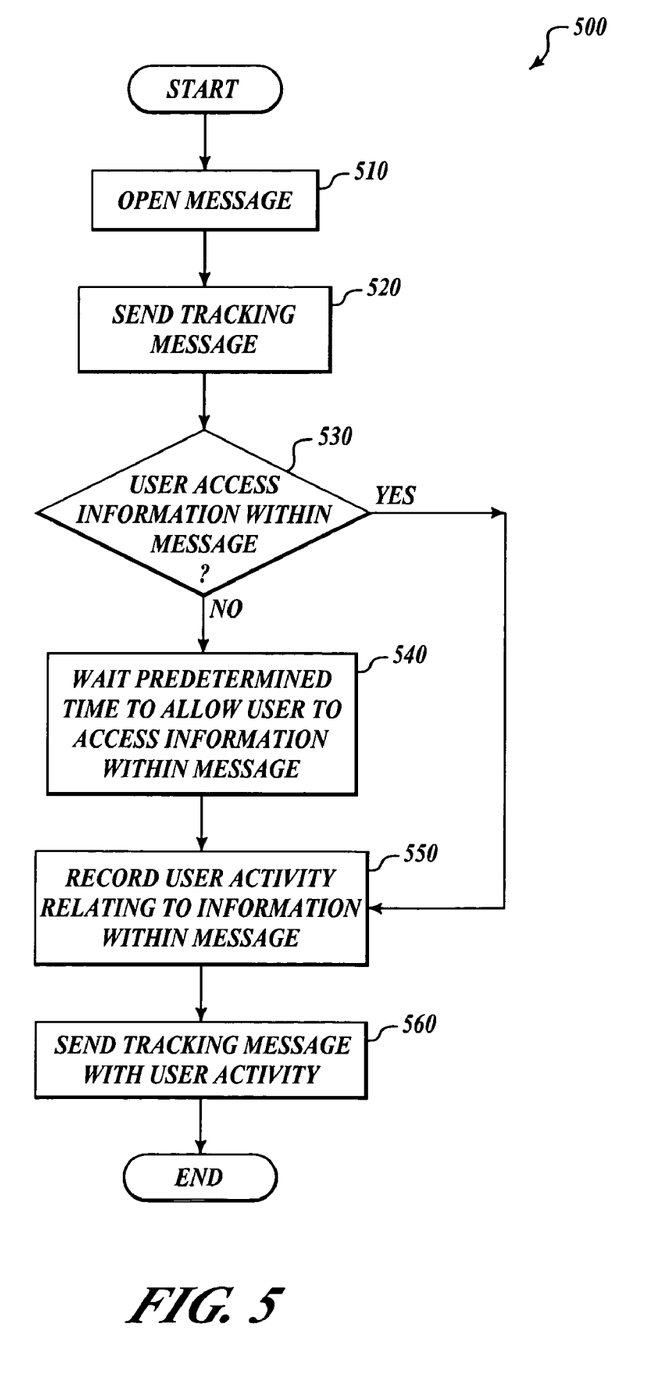
FIG. 5 shows a process for receiving and processing a product notice message.

FIG. 5 shows a process for receiving and processing a product notice message, in accordance with aspects of the invention.

After a start operation, the process flows to operation 510 where the receiver of the message opens the message. The message may be any type of electronic message. For example, the message may be an email, an instant message, and the like.

Transitioning to operation 520, upon opening the message, a tracking message is generated and sent to the creator of the message indicating that the message has been opened. The tracking message may be sent at any time. For example, the tracking message may be sent immediately upon the opening of the message, at some predetermined time after the opening of the message, at the beginning or at the end of the day, and the like. Additionally, the tracking message may include a list of all of the customers who opened the product notice message within a predetermined time frame.

Moving to decision operation 530, a determination is made if the customer accesses any of the traceable information within the message. As used herein, traceable information includes any information that is accessed within the message that may be traced back to the user's actions. For example, the user selects a link within the message; the user accesses a web site to perform a simulation relating to one of the products within the message, and the like.

When the user does not access any of the traceable information contained with the message, the process flows to operation 540 where the process waits a predetermined amount of time for the user to access traceable information within the message. According to one embodiment, the period of time may range from one to seven days. Other time periods may also be used.

When the user does access traceable information within the message, the process transitions to operation 550 where any activity relating to the activation of the traceable information is recorded. This information is saved in a database which may then be used later to send to the sender about the user's activity. For example, when the user accesses a link within the message, the time and date may be recorded as well as what products are accessed.

Moving to operation 560, if the customers accessed traceable information within the message, an activity message is sent to the creator of the product notice message that contains information about what in particular was visited on the website. According to one embodiment, specific part numbers may also be included in the message that is sent to the creator of the message.

The process then moves to end operation where it returns to processing other actions.

Figure 6:
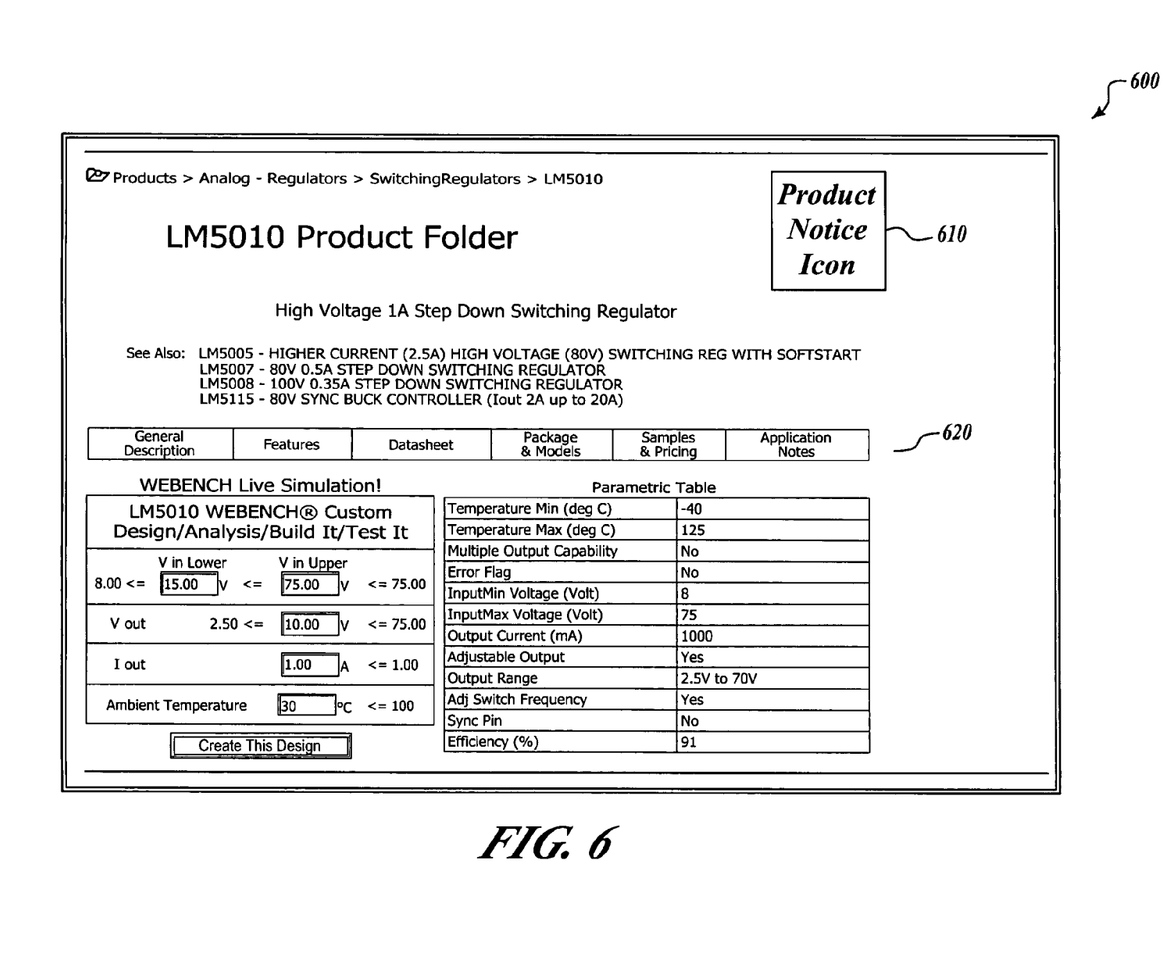
FIG. 6 shows an exemplary web page including a product notice icon.

FIG. 6 shows an exemplary web page (600) including a product notice icon, in accordance with aspects of the invention. According to one embodiment, the product notice icon 610 only appears for users that are authorized. Typically, these users have a relationship with the company such as being a distributor or a sales representative. These users may be identified in many different ways. According to one embodiment, a cookie on the user's computing device is examined to determine if the user who is accessing page 600 is an authorized user. If the user is authorized, then product notice icon 610 is displayed on web page 600. The product notice icon 610 is displayed on a screen that shows product information 620 for product LM5010. In this particular example, product information 620 includes information that relates to the LM5010 switching regulator developed by NATIONAL SEMICONDUCTOR CORPORATION. Although shown in the context of electronic circuits, product notice icon 610 may be included on any type of page. For example, the products could relate to digital electronics, hard goods, soft goods, and the like.

Figure 7:
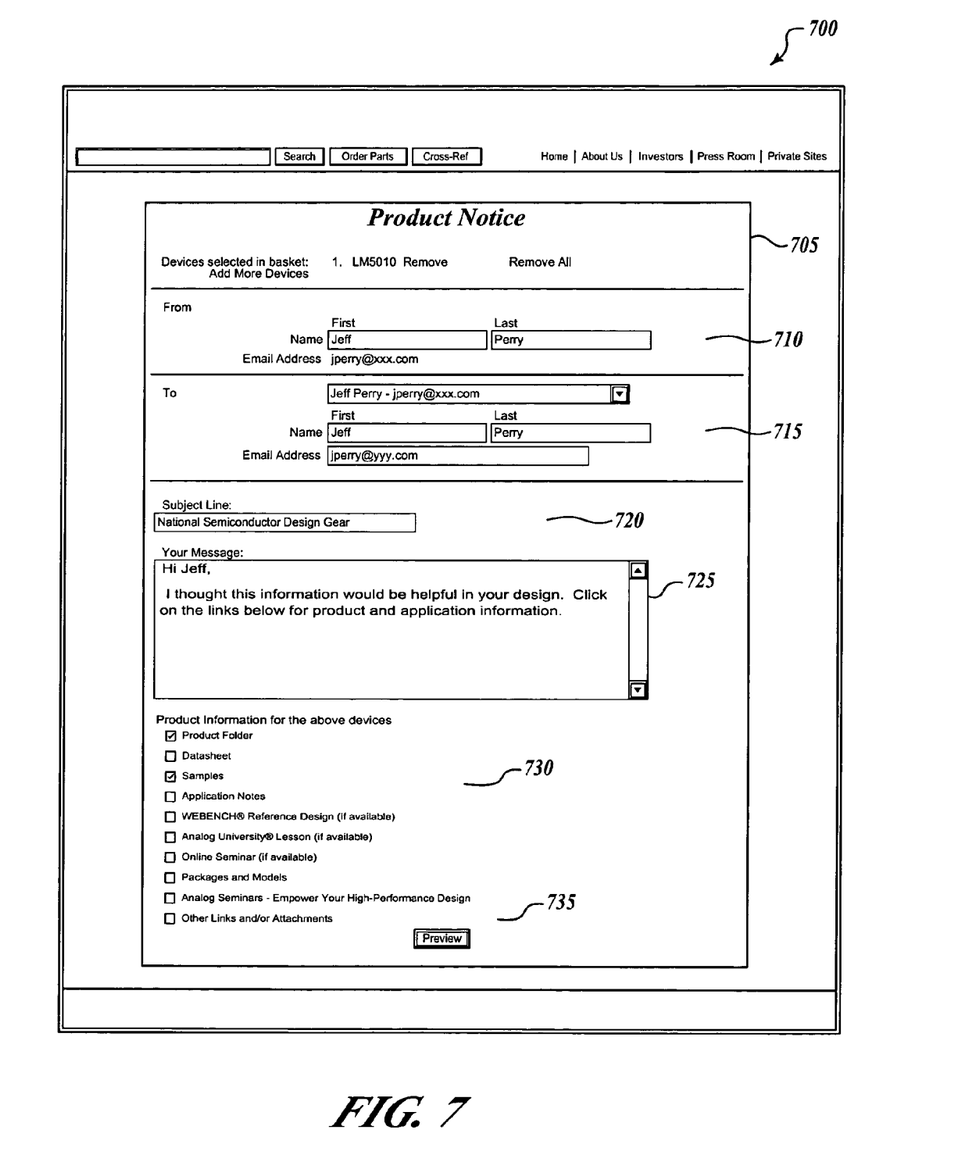
FIG. 7 illustrates an exemplary web page for entering information about customizing the product notice message.

FIG. 7 illustrates an exemplary web page for entering information about customizing the product notice message, in accordance with aspects of the invention. Web page 700 includes outline 705 that includes "From" field 710: "To" field 715; "Subject Line" field 720; message box 725; product material and information 730 and preview button 735.

The "From" field 710 identifies the sender of the message along with the sender's address. The "To" field 715 is used to address the product notice message. According to one embodiment, the message is addressed to a single user. According to another embodiment, the message may be addressed to more than one user. As illustrated, the user may select a name from a drop down list and/or enter the addressee's name and address within the text boxes.

A "subject" line 720 allows the user to customize the subject of the message. A "personalized message" 725 allows the user to include a custom message for that user or set of users. Product information selection boxes 730 allow the user to include one or more pieces of information within the message. According to one embodiment, the user may select from product folder; data sheet; samples; application notes; reference design; analog lesson; online seminar; packages and models; and analog seminars. The user may also include other links and/or attachments. Typically, the product information in section 730 is traceable information when it is included within the product notice message that is delivered to the user(s).

The user may preview the product notice message at any time by selecting the "preview" button 735.

Figure 8:
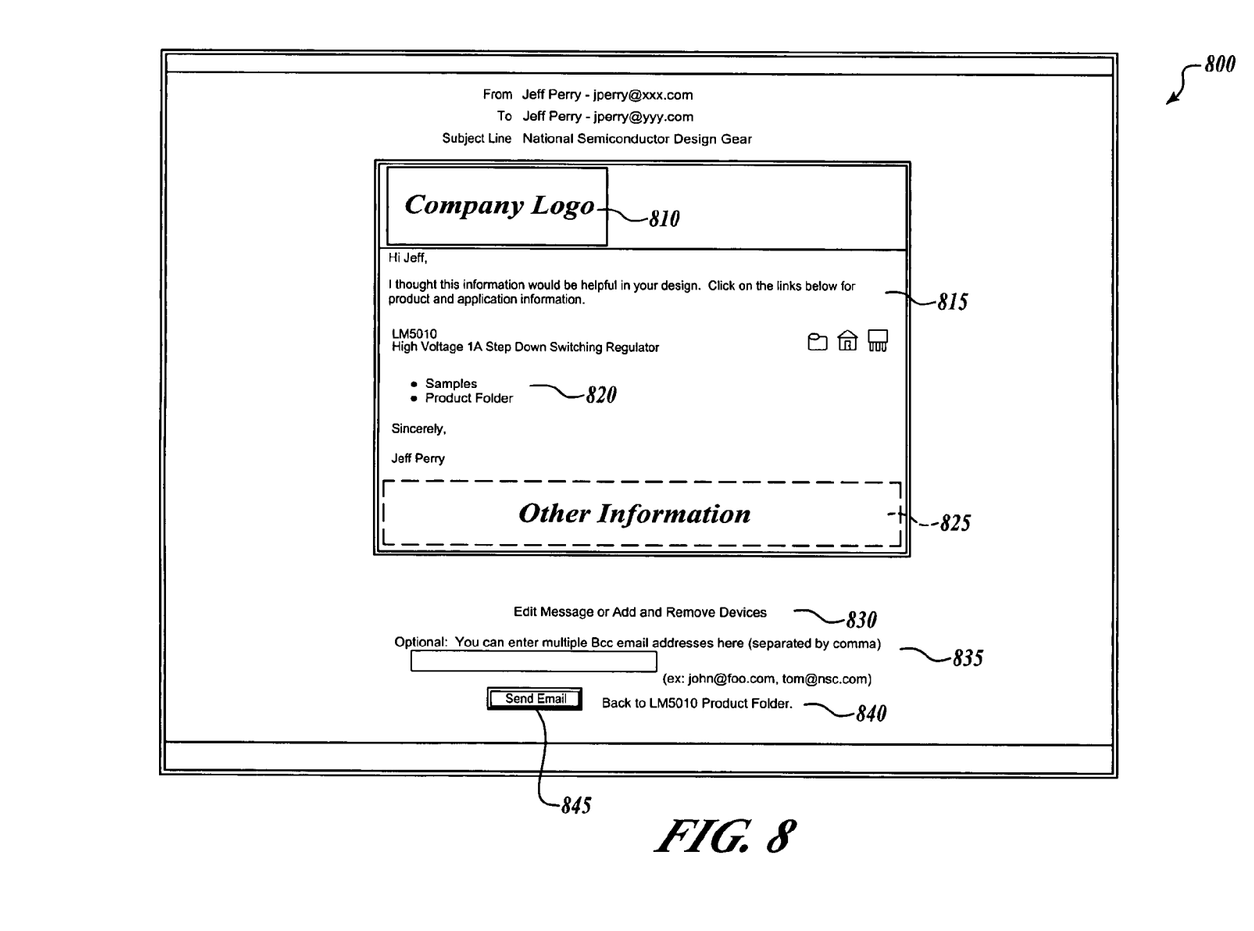
FIG. 8 illustrates a web page showing a preview of the product notice message.

FIG. 8 illustrates a web page showing a preview of the product notice message, in accordance with aspects of the invention. As can be seen on web page 800, the preview includes company logo 810; the "From" field, the "To" field; the subject line, along with the personalized information 815 and the product information 820 that was selected by the user on the specification page. Other information may also be included within area 825. For example, an advertisement may be placed within area 825. The user may also select the Edit Message or Add and Remove Devices link 830 at any time to modify the products that are included within the message. Additionally, the sender can decide to add "bcc" addresses using text box 835. The user may also return to the product page where they initially selected the pitch icon by selecting link 840. Once the user is satisfied with the message, they may select the Send Email button 845 and send the message to the specified user(s).

Figure 9:
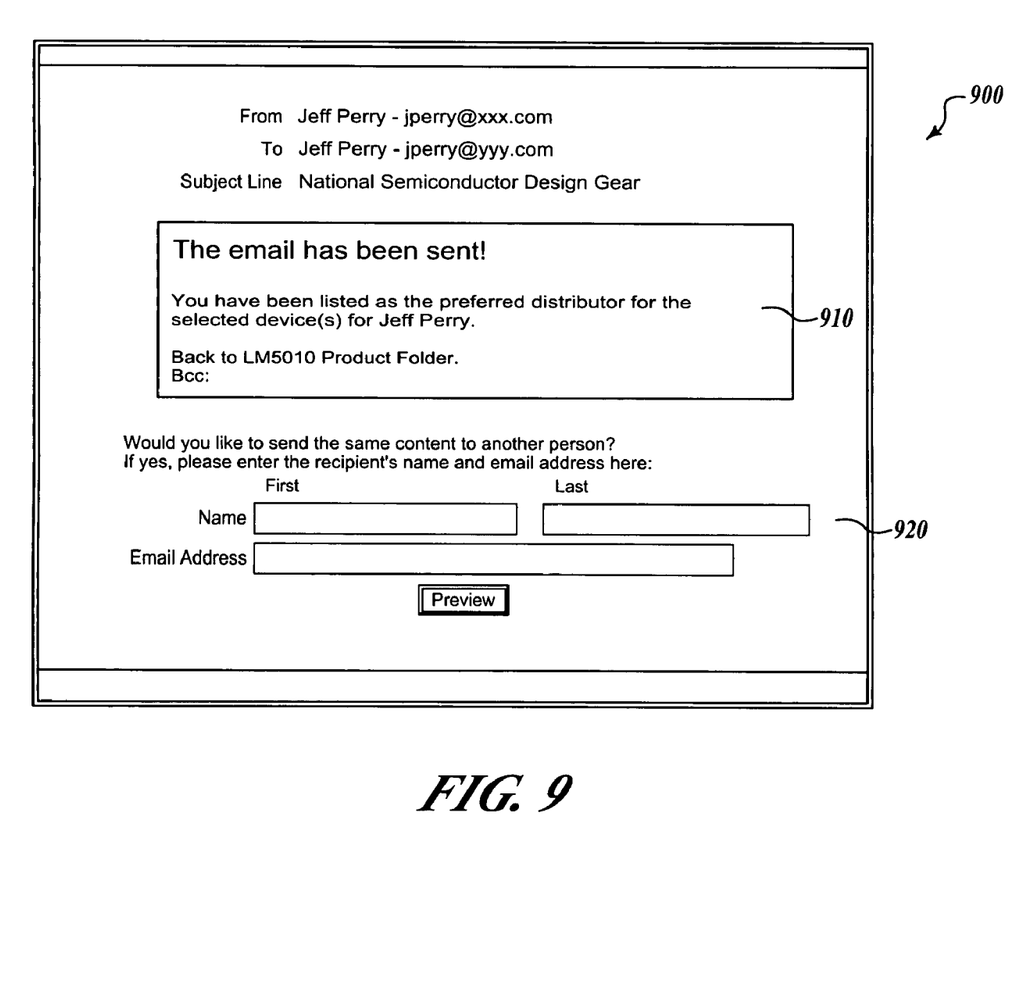
FIG. 9 illustrates an exemplary confirmation page.

FIG. 9 illustrates an exemplary confirmation page, in accordance with aspects of the invention. Confirmation 900 is provided to the sender of the message that indicates that the product notice message has been sent to the specified user(s) as is illustrated within text box 910. The sender may also send the product notice message to other users by entering their address information into text boxes 920. The user may also preview the message in case they want to modify any of the information contained within the message before it is sent to the customers identified within text boxes 920.

Figure 10:
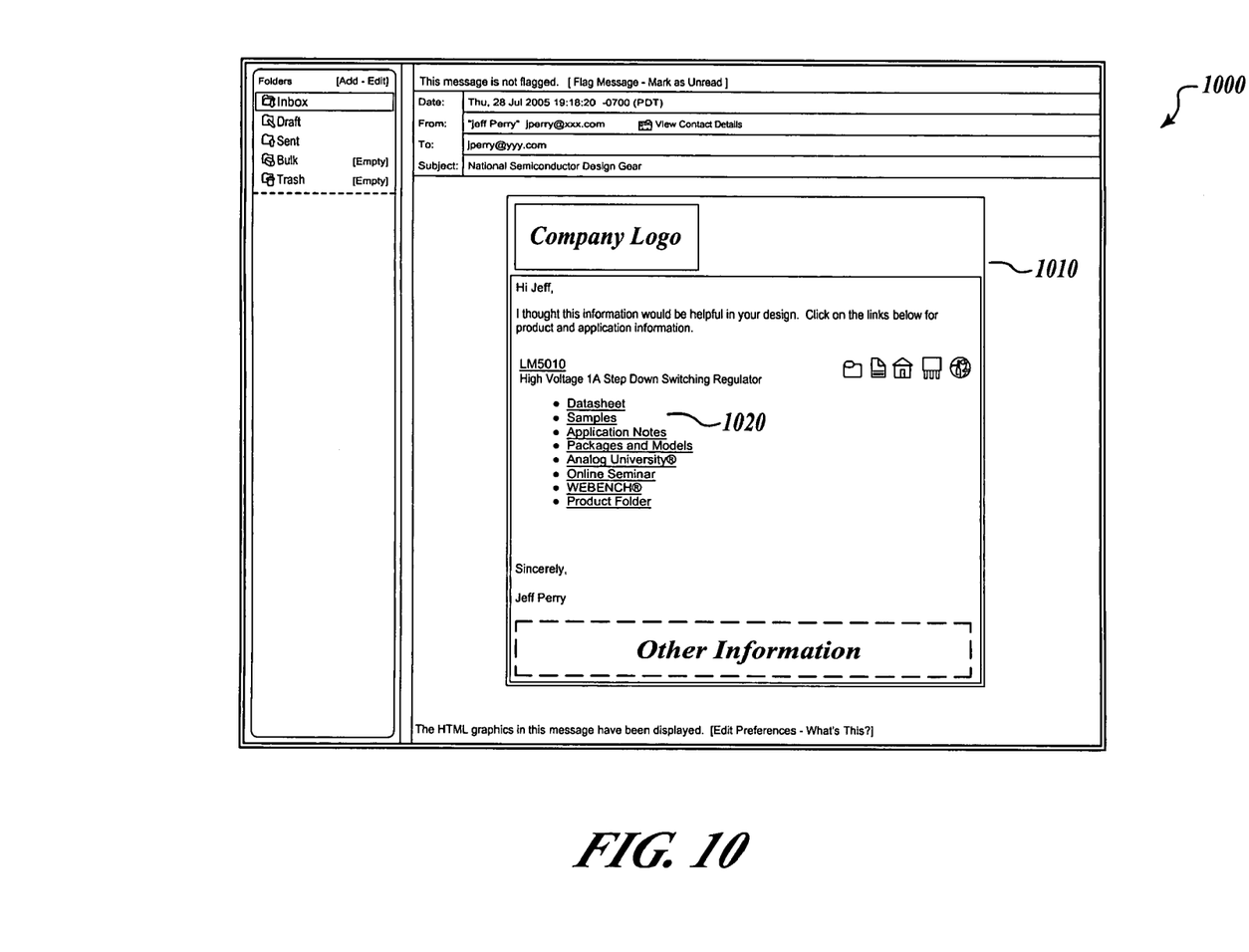
FIG. 10 illustrates an exemplary product notice message that is received by a user.

FIG. 10 illustrates an exemplary product notice message that is received by a user, in accordance with aspects of the invention. Looking at product notice message 1010, it can be seen that the message includes the personalized information along with product information and a set of links 1020. As described above, the links 1020 are traceable information in that when the user accesses one of the links their activity relating to the links may be saved and used when generating an activity message. A tracking message is automatically sent to the sender after the message has been accessed by the user.

Figure 11:
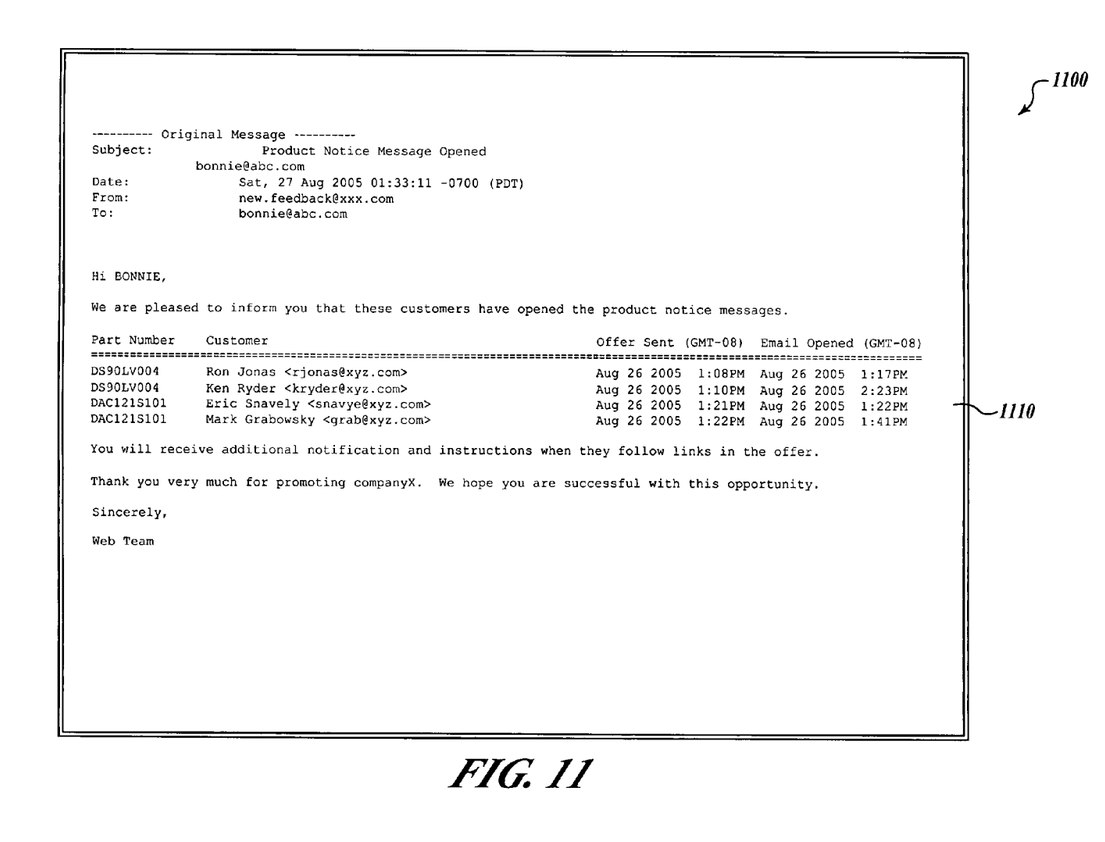
FIG. 11 illustrates an exemplary tracking message.

FIG. 11 illustrates an exemplary tracking message 1100, in accordance with aspects of the invention. As is illustrated, tracking message 1100 includes the users who accessed the product notice messages within a predetermined time period. As shown, the tracking message includes the part number, the customer names, when the offer was initially sent, and when the message was opened (1110).

The tracking message may be sent to the sender of the product notice messages at any determined time. For example, the tracking message may be sent to each sender at the end of a working day. Alternatively, the tracking message may be immediately sent upon any access to a product notice message. In the present example, for instance, four individual tracking messages could have been sent to the sender "Bonnie" at times 1:17, 1:22, 1:41; and 2:23.

Figure 12:
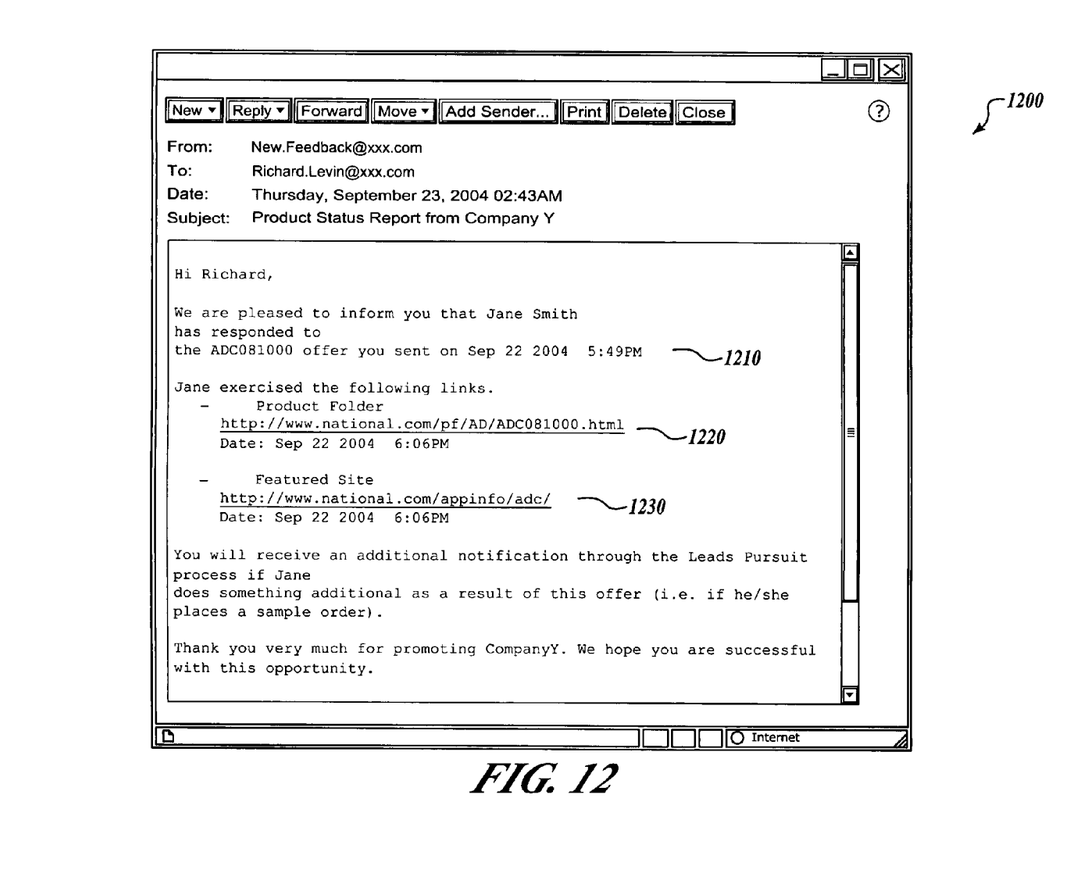
FIG. 12 illustrates an activity message, in accordance with aspects of the invention.

FIG. 12 illustrates an activity message, in accordance with aspects of the invention. The activity message is delivered to the sender of the product notice message and includes information relating to the activity of the customer accessing the traceable information within the product notice message. More or less detail may be included within message 1200. In the present example, the sender of the product notice message "Richard" is provided with the following information: when the original message (1210) was sent to the customer along with the date and times the user "Jane" accessed the links within the message (1220 and 1230). The activity message may be sent at predetermined times, such as every day, every four hours, upon an access or at some other predetermined time.

System Overview

FIGS. 1-3 illustrate an exemplary operating environment. Aspects of the present invention are embodied in a World Wide Web (WWW) site accessible via the Internet according to one embodiment of the invention.

FIG. 1 shows a plurality of local area networks ("LANs") 120$_{a-d}$ and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links. Furthermore, computers, such as remote computer 140, and other related electronic devices can be remotely connected to either LANs 120 or WAN 130 via a modem and temporary telephone link. A remote computer may act in a number of ways, including as a WWW server as described in FIG. 2 or a client computer as described in FIG. 3. It will be appreciated that the Internet 100 comprises a vast number of such interconnected networks, computers, and routers and that only a small, representative section of the Internet 100 is shown in FIG. 1.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media. The Internet 100 may include networks constructed from, coupled to, or connected with any type or combination of communication media.

Documents on the WWW, called pages or Web pages, are typically written in HTML (Hypertext Markup Language), XML (eXtensible Markup Language) or some other markup language, identified by URLs (Uniform Resource Locators) that specify the particular machine and pathname by which a file can be accessed, and transmitted from server to end user using HTTP (Hypertext Transfer Protocol). These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via e-mail by using links on the Web page.

A WWW server is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document.

FIG. 2 shows an exemplary WWW server 200 that is operative to provide a WWW site. Accordingly, WWW server 200 transmits WWW pages to the WWW browser application program executing on client computer 300 (FIG. 3) to carry out this process. For instance, WWW server 200 may transmit pages and forms for receiving information about a user, such as address, telephone number, billing information, credit card number, etc. Moreover, WWW server 200 may transmit WWW pages to client computer 300 that allow a consumer to participate in a WWW site. The transactions may take place over the Internet 100 or some other communications network.

WWW server 200 may include many more components than those shown in FIG. 2. However, the components shown are sufficient to disclose an illustrative embodiment for practicing the present invention. As shown in FIG. 2, WWW server 200 is connected to Internet 100, or other communications network, via network interface unit 210. Network interface unit 210 includes the necessary circuitry for connecting WWW server 200 to Internet 100, and is constructed for use with various communication protocols including the TCP/IP protocol. Typically, network interface unit 210 is a card contained within WWW server 200. WWW server 200 also includes processing unit 212, video display adapter 214, and a mass memory, all connected via bus 222. The mass memory generally includes RAM 216, ROM 232, and one or more permanent mass storage devices, such as hard disk drive 228, tape drive, optical drive 226, and/or floppy disk drive. The mass memory stores operating system 220 for controlling the operation of WWW server 200. It will be appreciated that this component may comprise a general purpose server operating system, such as UNIX, LINUX™, or Microsoft WINDOWS. Basic input/output system ("BIOS") 232 is also provided for controlling the low-level operation of WWW server 200. The storage devices may be used to store web logs that store the activity on the web site(s). For example, the web logs may store the information relating to when a link is selected.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a WWW site. More specifically, the mass memory stores applications including WWW server application program 230. WWW server application program 230 includes computer executable instructions which, when executed by WWW server computer 200, generate WWW browser displays, including performing the logic described above. WWW server application program 230 may also create and transmit displays described in conjunction with FIGS. 4-12 in conjunction with product notice program 234. WWW server 200 may also include a JAVA virtual machine, an SMTP handler application for transmitting and receiving e-mail, an HTTP handler application for receiving and handing HTTP requests, JAVA applets for transmission to a WWW browser executing on a client computer, and an HTTPS handler application for handling secure connections. The HTTPS handler application may initiate communication with an external security application for communicating in a secure fashion.

WWW server 200 also comprises input/output interface 224 for communicating with external devices, such as a mouse, keyboard, scanner, or other input devices not shown in FIG. 2. Likewise, WWW server 200 may further comprise additional mass storage facilities such as CD-ROM/DVD-ROM drive 226 and hard disk drive 228. Hard disk drive 228 is utilized by WWW server 200 to store, among other things, application programs, databases, and program data used by WWW server application 230. For example, customer databases, product databases, image databases, and relational databases may be stored.

FIG. 3 depicts several components of client computer 300. Client computer 300 may include many more components than those shown in FIG. 3 and may be configured as a mobile device or a traditional desktop computing device. However, it is not necessary that those generally conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. The connection may be wireless or wired. Network interface unit 302 includes the necessary circuitry for such a connection, and is also constructed for use with various communication protocols including the TCP/IP protocol, the particular network configuration of the LAN or WAN it is connecting to, and a particular type of coupling medium.

Client computer 300 also includes BIOS 326, central processing unit 306, video display adapter 308, and memory. The memory generally includes random access memory ("RAM") 310, read-only memory ("ROM") 304 and a permanent mass storage device, such as a disk drive. The memory stores operating system 312 and programs 334 for controlling the operation of client computer 300. The memory also includes WWW browser 314, such as Microsoft's INTERNET EXPLORER® browsers, for accessing the WWW. These components may be stored on a computer-readable medium and loaded into memory of client computer 300 using a drive mechanism associated with the computer-readable medium, such as a USB drive, optical drive 316 or some other optical drive, or hard drive 318. Input/output interface 320 may also be provided for receiving input from a mouse, keyboard, or other input device. The memory, network interface unit 302, video display adapter 308, and input/output interface 320 are all connected to central processing unit 306 via bus 322. Other peripherals may also be connected to central processing unit 306 in a similar manner.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for generating and delivering a product notice message, comprising:
identifying a user accessing a web page that identifies at least one product;
displaying a product notice option on the web page to the user, wherein the product notice option provides an option to create a customized product notice message for the at least one product;
determining when the product notice option is selected, and in response to the selection:
determining at least one addressee for the product notice message, wherein the product notice message includes information about the at least one product;
customizing the product notice message to include traceable information, wherein the traceable information includes a link to information about the at least product such that, when the at least one addressee accesses the link, a record that the at least one addressee accessed the link is transmitted;

sending the product notice message to the at least one addressee; and notifying the user when the product notice message is opened by the at least one addressee using a tracking message, wherein the tracking message comprises a list of all addressees who have accessed the link within a specified time.

2. The method of claim 1, wherein identifying the user and displaying the product notice option to the user comprises displaying the product notice option after determining that the user is an authorized user.

3. The method of claim 2, wherein determining that the user is an authorized user comprises determining that the user is an authorized seller of the at least one product.

4. The method of claim 1, wherein displaying the product notice option comprises displaying a product notice icon on the web page.

5. The method of claim 1, further comprising displaying a preview of the product notice message.

6. The method of claim 1, further comprising determining when the product notice message is opened by the at least one addressee and sending the tracking message to the user in response.

7. The method of claim 1, further comprising determining when the traceable information within the product notice message is accessed and sending an activity message to the user that indicates an activity.

8. The method of claim 7, wherein determining when the traceable information within the product notice message is accessed and sending the activity message comprises storing the activity relating to the traceable information such that information about the activity may be accessed at a later time.

9. A computer-readable storage medium having computer executable instructions for generating and delivering a product notice message, comprising wherein the computer executable instructions comprise instructions for:

determining when a user accessing a web page is an authorized user allowed to customize a product notice message that includes information about a product;

displaying a product notice option when the user is authorized;

determining when the product notice option is selected, and in response to the selection:

receiving information identifying at least one addressee for the product notice message;

customizing the product notice message to include traceable information and a message and information about the product, wherein the traceable information includes at least one link such that when the at least one addressee accesses the link, a record that the at least one addressee accessed the link is transmitted;

sending the product notice message to the at least one addressee; and sending a tracking message to the user when the product notice message is opened by the at least one addressee, wherein the tracking message comprises a list of all addressees who have accessed the link within a specified time.

10. The computer-readable storage medium of claim 9, wherein the instructions for displaying the product notice option comprise instructions for only displaying the product notice option to the user after determining that the user is an authorized user.

11. The computer-readable storage medium of claim 10, wherein the instructions for determining when the user is an authorized user comprises instructions for examining a cookie that is associated with the user.

12. The computer-readable storage medium of claim 9, wherein the instructions for displaying the product notice option comprise instructions for displaying a product notice icon on the web page.

13. The computer-readable storage medium of claim 9, further comprising instructions for providing a preview of the product notice message to the user.

14. The computer-readable storage medium of claim 9, further comprising instructions for determining when the product notice message is accessed by the at least one addressee and sending the tracking message to the user.

15. The computer-readable storage medium of claim 9, further comprising instructions for determining when the traceable information within the product notice message is accessed and sending an activity message to the user that indicates an activity at specified times.

16. An apparatus for rapid specification and electronic delivery of information, comprising:

a network connection device operative to connect to a network and a client computing device;

a data store that is configured to store activity that relates to accessing information that is associated with a product notice message; and an application that is configured to:

display a product notice option on a web page in association with a product when a user is authorized to customize the product notice message;

determine when the product notice option is selected, and in response to the selection:

receive options from the authorized user to configure the product notice message, wherein the options include traceable information that is included within the product notice message and information about the product selected by the authorized user, wherein the traceable information includes a link to information about the product such that, when at least one addressee accesses the link, a record that the at least one addressee accessed the link is transmitted;

send the product notice message to the at least one addressee; and send a tracking message to the authorized user, wherein the tracking message comprises a list of all addressees who have accessed the link within a specified time.

17. The apparatus of claim 16, wherein the application is configured to determine when the user is authorized accessing a cookie on a client computing device.

18. The apparatus of claim 16, wherein the application is further configured to determine when the product notice message is accessed by the at least one addressee and a to send the tracking message in response.

19. The apparatus of claim 16, wherein the application is further configured to send an activity message to the authorized user that indicates an activity that is associated with the product notice message.

20. The apparatus of claim 19, wherein the application is further configured to determine when the link within the product notice message is selected.

* * * * *